(12) United States Patent
Kassin

(10) Patent No.: US 12,020,263 B2
(45) Date of Patent: Jun. 25, 2024

(54) DIGITAL PRICE DISPLAY

(71) Applicant: Albert Kassin, Levittown, NY (US)

(72) Inventor: Albert Kassin, Levittown, NY (US)

(73) Assignee: Best Brands Consumer Products, Inc., Edison, NJ (US)

( * ) Notice: Subject to any disclaimer, the term of this patent is extended or adjusted under 35 U.S.C. 154(b) by 0 days.

(21) Appl. No.: 17/548,758

(22) Filed: Dec. 13, 2021

(65) Prior Publication Data

US 2022/0101345 A1    Mar. 31, 2022

Related U.S. Application Data

(63) Continuation of application No. 16/542,634, filed on Aug. 16, 2019, now Pat. No. 11,227,293.

(60) Provisional application No. 62/719,086, filed on Aug. 16, 2018.

(51) Int. Cl.
| | |
|---|---|
| G06Q 30/02 | (2023.01) |
| G06F 3/147 | (2006.01) |
| A47F 10/02 | (2006.01) |
| G06Q 20/20 | (2012.01) |
| G06Q 30/0601 | (2023.01) |

(52) U.S. Cl.
CPC ............ *G06Q 30/02* (2013.01); *A47F 10/02* (2013.01); *G06F 3/147* (2013.01); *G06Q 20/203* (2013.01); *G06Q 30/0641* (2013.01); *G09G 2380/04* (2013.01)

(58) Field of Classification Search
USPC ........................................... 705/20; 340/5.91
See application file for complete search history.

(56) References Cited

U.S. PATENT DOCUMENTS

| | | | | | |
|---|---|---|---|---|---|
| 4,722,146 | A | * | 2/1988 | Kemeny | E04B 2/7429 52/800.11 |
| 6,209,831 | B1 | * | 4/2001 | Kiplinger | A47F 5/0869 40/642.01 |
| 6,279,256 | B1 | * | 8/2001 | Norolof | A47F 5/0869 40/642.01 |

(Continued)

FOREIGN PATENT DOCUMENTS

| | | | | | |
|---|---|---|---|---|---|
| DE | 202012100644 | U1 | * | 6/2012 | ........... A47F 5/0869 |
| GB | 2464353 | A | * | 4/2010 | ............... G09F 3/20 |

OTHER PUBLICATIONS

Anon., "PEAK Technologies Provides Turnkey Oracle WMS/Auto ID Solution, Saves Company an Estimated $4 Million," Business Wire, Apr. 11, 2006. (Year: 2006).*

*Primary Examiner* — Nicholas D Rosen
(74) *Attorney, Agent, or Firm* — Goldberg Cohen LLP (57) ABSTRACT

A digital pricing display includes a digital display unit having in interoperable communication a central processing unit, a display screen, a memory, a communication module having an antenna associated therewith, and an instruction set hosted on the memory and executable by the central processing unit, the instruction set operational to receive pricing and product information for a product and to display the product pricing and product information on the display screen. An elongate strip is attached to and extends downwardly from the digital display unit. The elongate strip has a plurality of hooks substantially in vertical alignment formed therealong; the purpose of each hook is for receiving thereon a product package corresponding to the product pricing and product information displayed by the digital display unit.

6 Claims, 8 Drawing Sheets

(56) References Cited

U.S. PATENT DOCUMENTS

| | | | | |
|---|---|---|---|---|
| 7,311,212 B2* | 12/2007 | Martin | ................... | A47F 5/005 |
| | | | | 211/184 |
| 7,530,188 B2* | 5/2009 | Beilenhoff | .............. | G09F 3/204 |
| | | | | 40/658 |
| 7,712,616 B2* | 5/2010 | Barkdoll | ............... | A47F 5/0807 |
| | | | | 211/59.1 |
| 8,104,684 B2* | 1/2012 | Lee | ................. | G06K 19/06028 |
| | | | | 204/600 |
| 8,698,606 B2* | 4/2014 | Choi | ....................... | G09F 3/208 |
| | | | | 340/10.6 |
| 9,107,514 B1* | 8/2015 | Morieras | ................... | A47F 7/02 |
| 11,227,293 B2* | 1/2022 | Kassin | ................... | G06Q 30/02 |
| 2002/0167500 A1* | 11/2002 | Gelbman | ......... | G06K 19/07758 |
| | | | | 345/204 |
| 2005/0067362 A1* | 3/2005 | Martin | ................... | A47F 5/005 |
| | | | | 211/184 |
| 2006/0237604 A1* | 10/2006 | Tan | ....................... | G06F 1/1601 |
| | | | | 248/205.3 |
| 2007/0224879 A1* | 9/2007 | Beilenhoff | ............ | A47F 5/0869 |
| | | | | 439/501 |
| 2007/0278163 A1* | 12/2007 | Barkdoll | ............... | A47F 5/0807 |
| | | | | 211/59.1 |
| 2010/0108764 A1* | 5/2010 | Lee | ................. | G06K 19/06046 |
| | | | | 235/462.01 |
| 2011/0102155 A1* | 5/2011 | Choi | ....................... | G06Q 30/06 |
| | | | | 235/383 |
| 2014/0353368 A1* | 12/2014 | Connolly | .......... | H04W 52/0216 |
| | | | | 235/375 |
| 2015/0134429 A1* | 5/2015 | Katakwar | .......... | G06Q 30/0207 |
| | | | | 705/14.1 |
| 2017/0169799 A1* | 6/2017 | Kim | ................... | G06Q 30/0241 |

* cited by examiner

DIGITAL PRICE DISPLAY

BACKGROUND OF THE INVENTION

Labeling of retail product prices has been utilized in one form or another for decades. Such labeling is necessary for an individual to recognize the established purchase price of a product. Initially, retailers would label each individual discrete product item so that a prospective consumer would be informed of the retail price in order to decide whether they wished to purchase the product. Additionally, when the products were stocked on shelves so that the consumer could choose the product and then present the item to a checkout clerk, the checkout clerk would charge the customer according to the price attached to the product item. However, such a system is very labor intensive, especially in a large department store, super market, or other "big box" stores.

With the advent of the digital age, one dimensional barcodes and two dimensional matrix codes have become popular. Each product is typically labeled by the manufacturer or distributor with a barcode or matrix code. A product is stocked on a shelf or rack by a store employee, and a label with the product name, price and barcode are affixed to the shelf or rack on which the product is presented to the consumer. After selection by the consumer, the product is presented at the checkout for purchase. The barcode or matrix code is then scanned by a reader interactive with a central computer system wherein the particular barcode or matrix code is associated with a product and its corresponding retail price. This system greatly speeds the checkout process as well as identifying purchasing trends and other such useful stocking data valuable to the store management without having to engage in frequent labor-intensive inventory processes. However, even the single labeling of the rack or shelf can be labor intensive, especially in large stores, and where item prices are often changing with sales or market variations.

Therefore, a system is provided herein to decrease the labor required to present the retail price to the consumer and whereby the system can be easily changed and present more information to the consumer.

SUMMARY OF THE INVENTION

In accordance with the invention, a digital pricing display is provided and includes a digital display unit having in interoperable communication a central processing unit, a display screen, a memory, a communication module having an antenna associated therewith, and an instruction set hosted on the memory and executable by the central processing unit, the instruction set operational to receive pricing and product information for a product and to display the product pricing and product information on the display screen. An elongate strip is attached to and extends downwardly from the digital display unit. The elongate strip has a plurality of hooks substantially in vertical alignment formed therealong, the purpose of each hook is for receiving thereon a product package corresponding to the product pricing and product information displayed by the digital display unit.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The invention relates to the field of retail sales and product pricing utilized by businesses for the purpose of labor efficiency. The digital pricing displays disclosed herein permit a business owner to place a digital pricing display at each desired product display such as shelves or racks and then, utilizing a remote controller, wirelessly change the prices, barcodes or matrix codes, and other identifying information of the product. The digital pricing displays eliminate the labor-intensive exercise of printing barcoded labels and then manually placing the labels in plastic holders or individual labeling of product tags. Likewise, the wireless communication allows a retailer to change pricing display information from a central location without going from display to display (whether a central location within a store, or a central location for a group of stores, or a central location for the entire chain). Alternatively, the pricing information can be changed by the retailer's representative locally, i.e. in passing by the individual displays.

In one embodiment of the invention, and as illustrated in FIGS. 1-4, a peghook digital pricing display 100 is shown. The peghook digital pricing display 100 has a digital pricing display 120 that includes a housing 122 and a digital display screen 130. The housing 122 of digital pricing display 120 has a clip 121 attached to a surface 123 opposite of display screen 130. The digital display screen 130 can display information such as, but not limited to, product and item number 132, price of the product 134, and a barcode 136 for the product.

Figure 1:
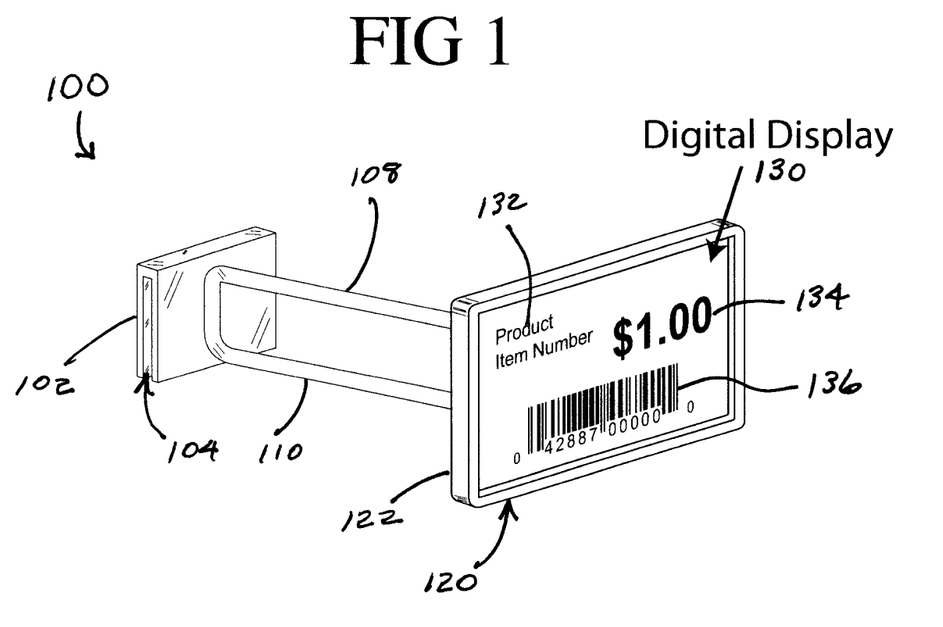
FIG. 1 presents an isometric view of a peghook digital price display fixture.
Figure 2:
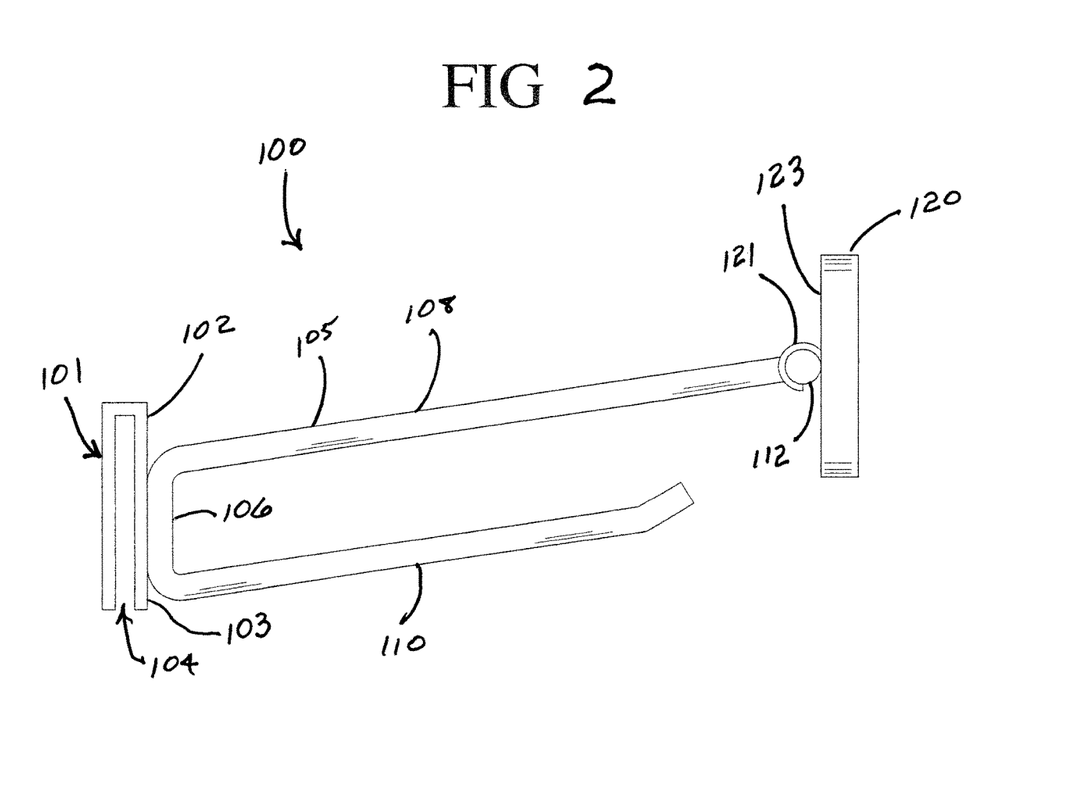
FIG. 2 presents a right side elevation view of the peghook digital price display fixture.

A peghook fixture 101 has an inverted U-shaped channel 102 defining a downward facing slot 104. One leg 103 of channel 102 has cross-segment 106 of a U-shaped peghook 105 affixed thereto in a manner such that there is an upper segment 108 and a lower segment 110 wherein lower segment 110 is formed to accept a plurality of products for purchase held thereon. Upper segment 108 is formed to rotatingly receive thereon the clip 121 affixed to the surface 123 of the housing 122 such that digital pricing display 130 can be rotated about a horizontal axis.

Figure 4:
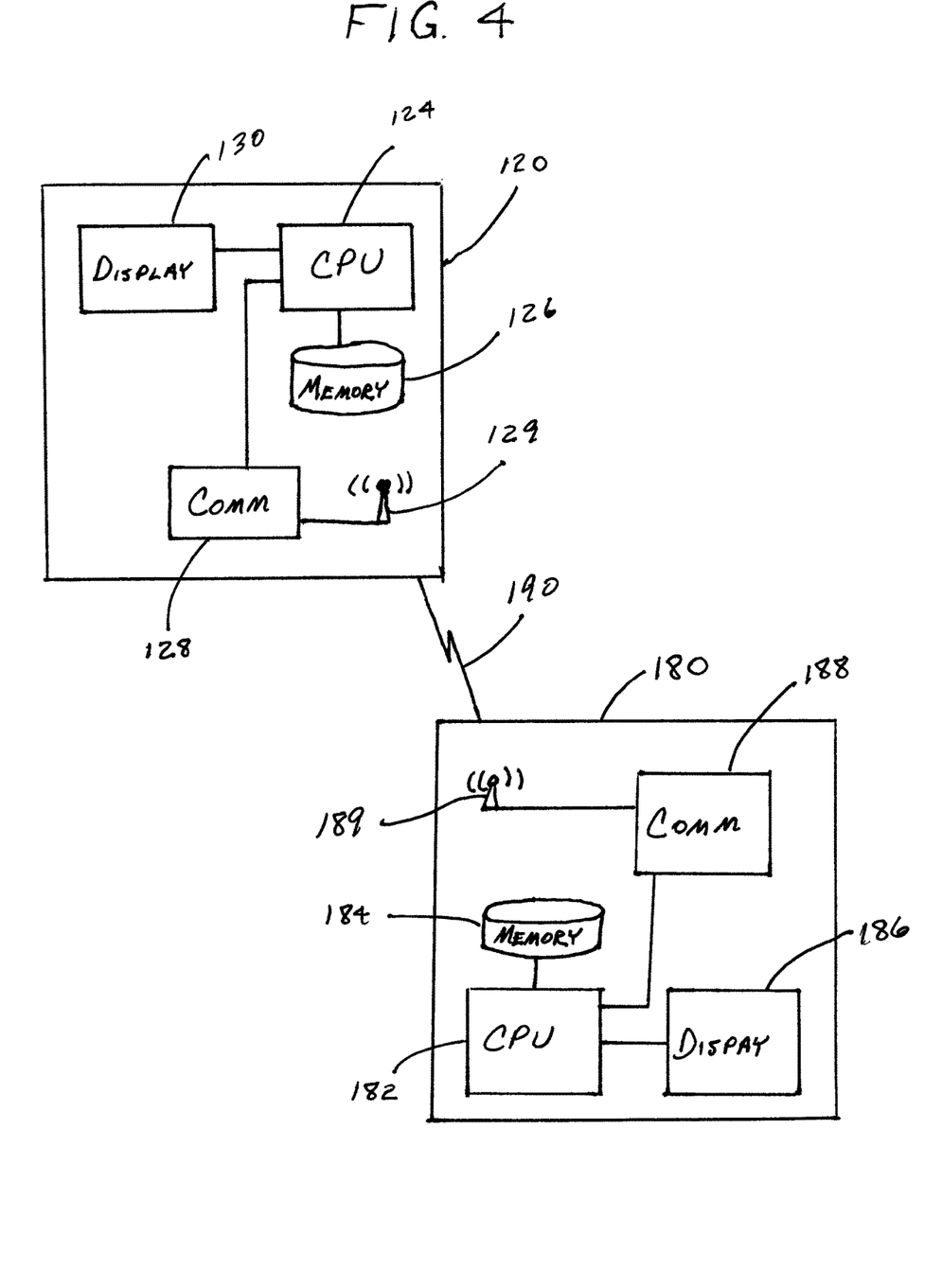
FIG. 4 presents is a schematic of a digital price display and an interactive controller for wirelessly changing the digital price display.

Internally, and as illustrated in FIG. 4, the digital pricing display includes a Central Processing Unit (CPU) 124 and a memory 126 operably connected to the CPU 124. The memory 126 stores an executable instruction set that, when executed by the CPU 124, drives the display screen 130 to display the desired information described above. A communication module 128 which also includes an antenna 129 functions to wirelessly communicate with a remote terminal 180. Remote terminal 180 also includes a central processing unit 182 and a memory 184 which is operably connected to the CPU 182. The memory 182 stores an executable instruction set that, when executed by the CPU 182 allows the user to select a particular product and the information desired to be displayed to prospective purchasers relative to that product. The selected information data is then transmitted by the communication module 188 and associated antenna 189 via wireless signal 190 to the digital pricing display 120 for display to prospective purchasers. Alternatively, any other wireless (or wired) communication system can be used to provide information to the digital pricing displays herein.

Figure 3:
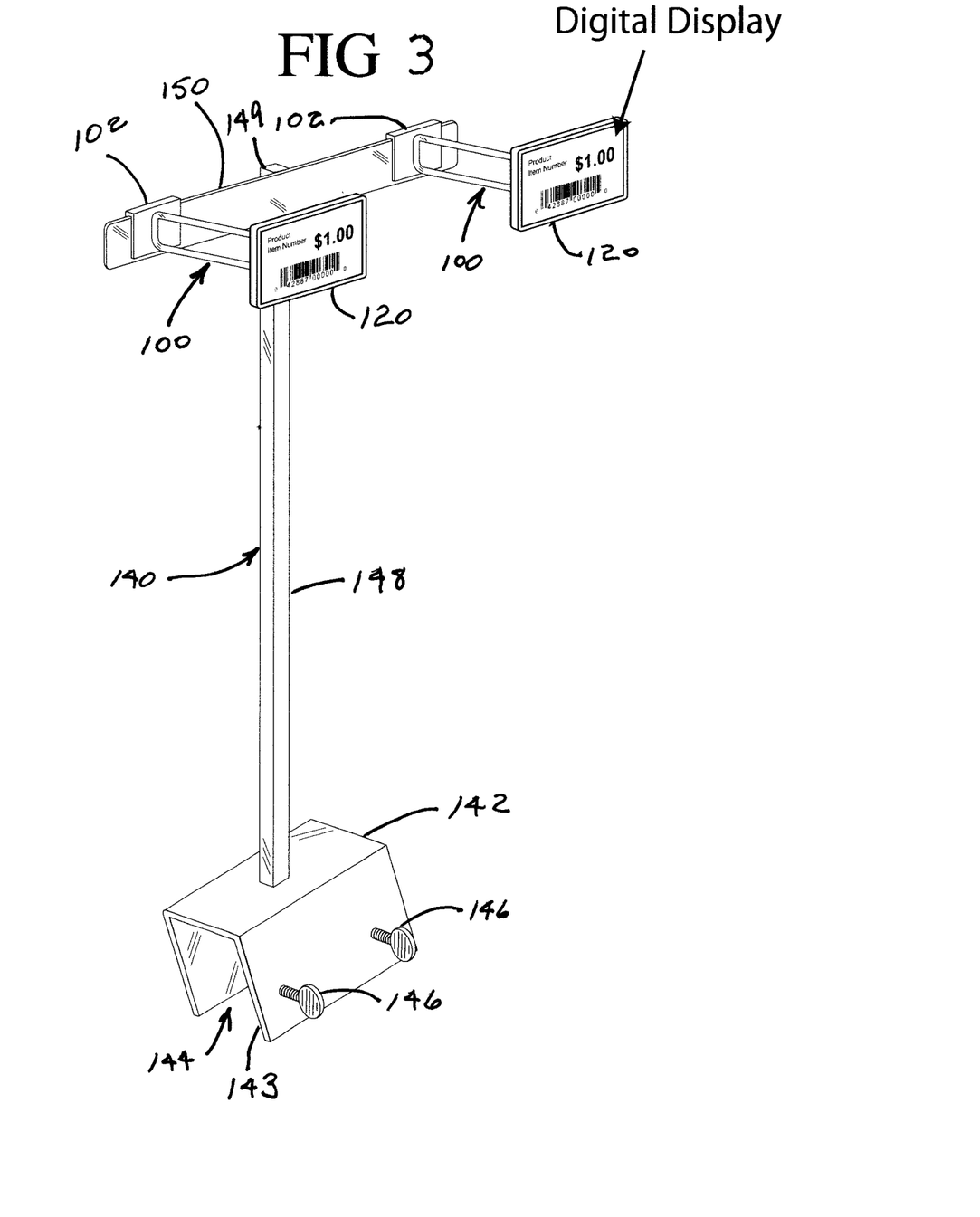
FIG. 3 presents an isometric view of a structure supporting two peghook digital price display fixtures of FIG. 1.

Turning now to FIG. 3, a produce digital fixture 140 is illustrated wherein the fixture 140 has a downward facing clevis 142 defining a channel 144 for receiving a wall of a produce bin (not shown). One leg 143 includes a plurality of thumb screws 146 to enable the clevis 142 to attach to the produce bin. An upright 148 is vertically affixed to the clevis 142 and extends upwardly therefrom. A flat elongate cross member 150 is affixed to an upper end 149 of upright 148. A plurality of peg hook digital pricing displays 100 can be mounted to the flat elongate cross member 150 and horizontally positioned therealong by receiving the cross member 150 in the slot 104 of the channel 102 such that the digital pricing display 120 is positioned over the produce contained in the bin to which the fixture 140 is attached.

Figure 5:
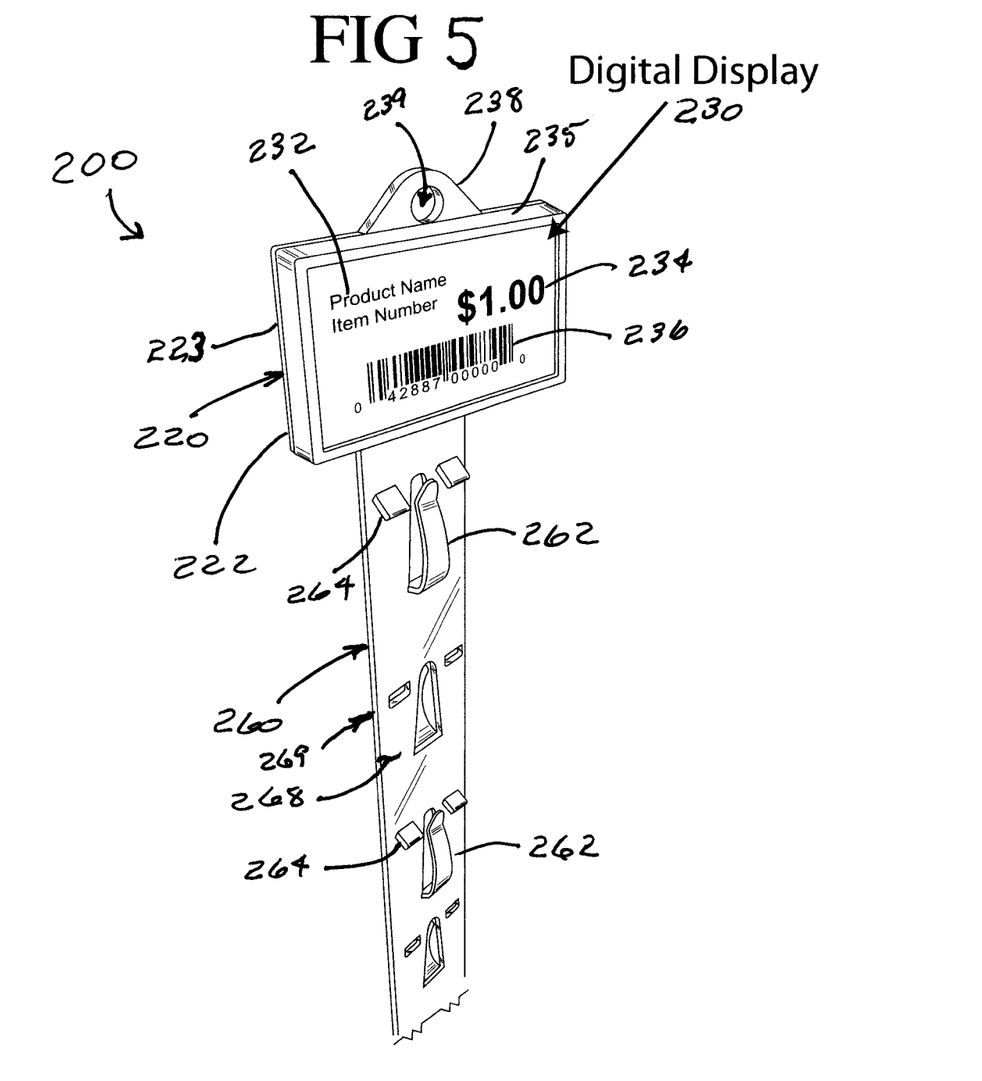
FIG. 5 presents a clip strip digital price display and configured to hang from a hook.

Another embodiment of the present invention is illustrated in FIG. 5 wherein a clip strip digital pricing display 200 is shown. A digital pricing display 220 has tab 238 affixed to an upper surface 235 of housing 222 and which defines a hole 239 therethrough for receiving a support hook to suspend the clip strip digital pricing display 200 therefrom. The digital display screen 230 can display information such as, but not limited to, product and item number 232, price of the product 234, and a barcode 236 for the product, and is functionally and schematically the same as digital pricing display 120 as shown in FIG. 4.

An elongate strip 260 is attached to and extends downwardly from a rear face 223 of the housing 222 of digital pricing display 220. A plurality of hooks 262 extend from one or both faces 268, 269 of the elongate strip 260 for receiving a hole defined by an upper portion of a product for sale. A series of tabs 264 can also be formed on and extend from one or both faces 268, 269 of the elongate strip 260 to further secure a product to the elongate strip 260.

Figure 6:
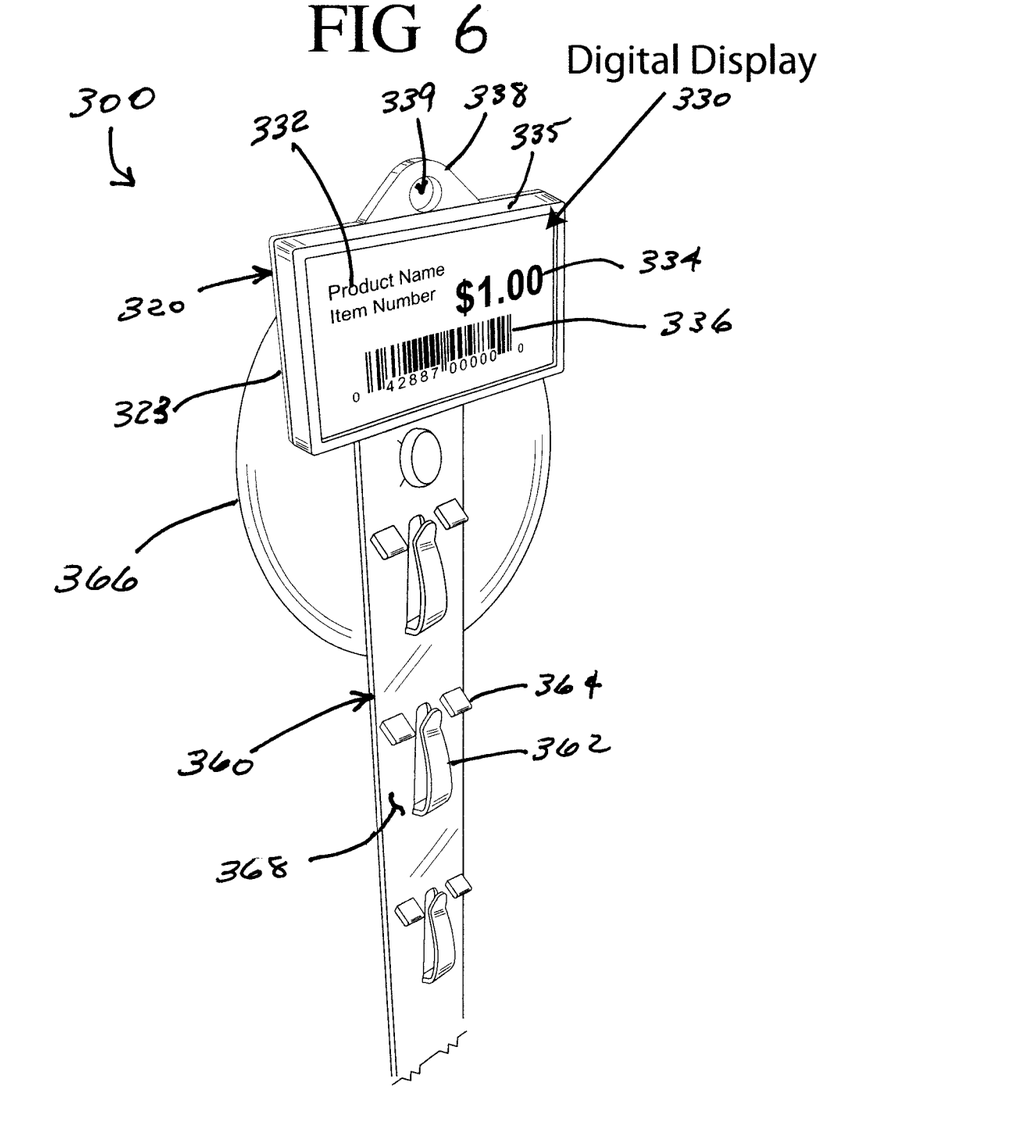
FIG. 6 presents a second configuration of a clip strip digital price display and configured with a suction cup for attaching to a smooth surface.

A further embodiment of the present invention is illustrated in FIG. 6 wherein a suction clip strip digital pricing display 300 is shown. A digital pricing display 320 is substantially identical to the digital pricing display 220 of FIG. 5. The display 320 has tab 338 affixed to an upper surface 335 of housing 322 which defines a hole 339 therethrough for receiving a support hook to suspend the suction clipstrip digital pricing display 300 therefrom. The digital display screen 330 can display information such as, but not limited to, product and item number 332, price of the product 334, and a barcode 336 for the product, and is functionally and schematically the same as digital pricing display 120 as shown in FIG. 4.

An elongate strip 360 is attached to and extends downwardly from a rear face 323 of the housing 322 of digital pricing display 320. A plurality of hooks 362 extend from a face 368 of the elongate strip 360 for receiving a hole defined by an upper portion of a product for sale. A series of tabs 364 can also be formed on and extend from the face 368 of the elongate strip 360 to further secure a product to the elongate strip 360. Additionally, a suction cup 366 is positioned opposite of hooks 362 and attached to the elongate strip 360 for attaching the suction clip strip digital pricing display 300 to a substantially smooth vertical surface.

Figure 7:
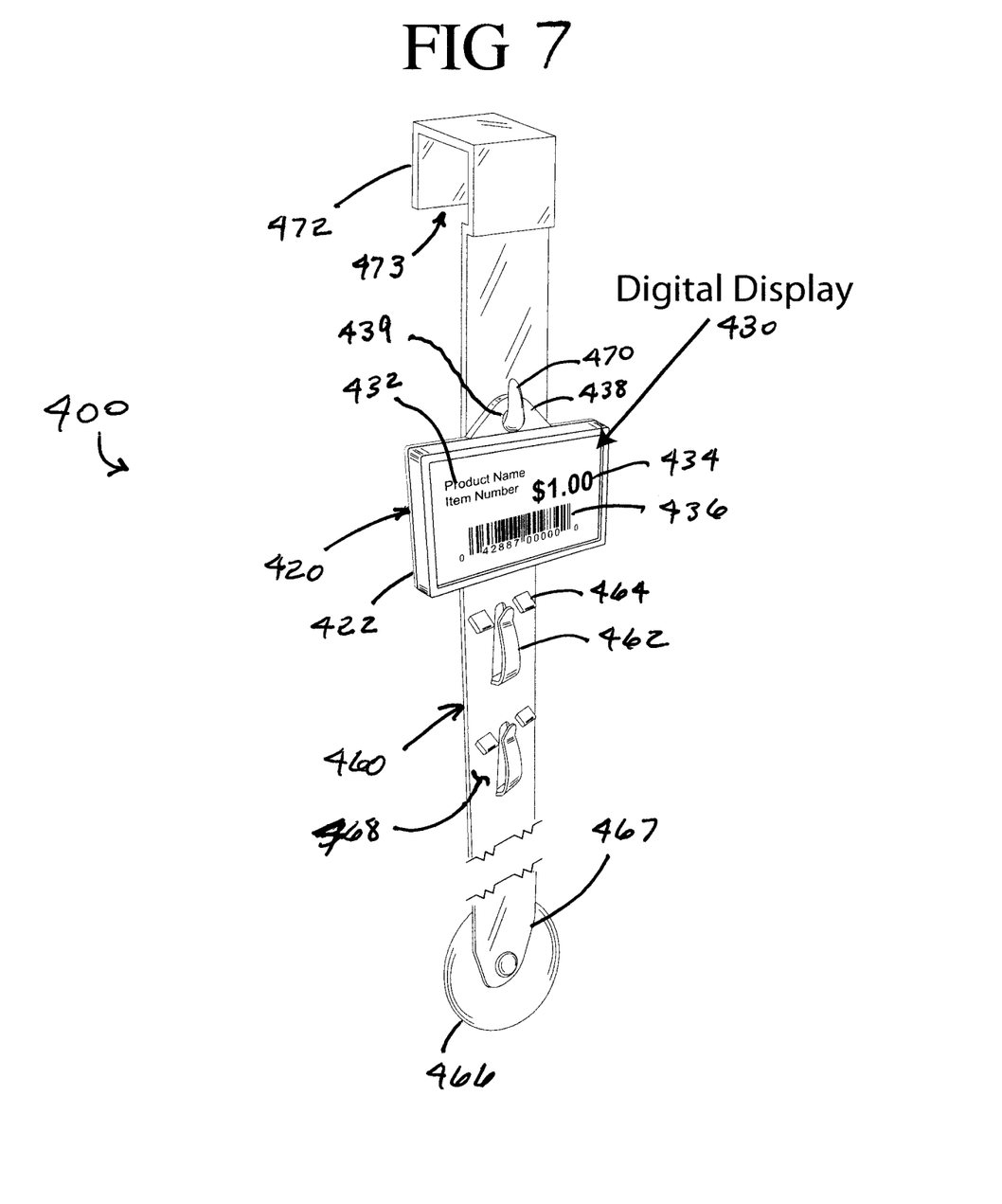
FIG. 7 presents a third configuration of a clip strip digital price display and configured for engaging and hanging from a door.

Another alternate embodiment of the present invention is illustrated in FIG. 7 wherein an over the door digital pricing display 400 is shown. A digital pricing display 420 is substantially identical to the digital pricing display 220 of FIG. 5. The display 420 has tab 438 affixed to an upper surface 435 of housing 422 which defines a hole 439 therethrough for receiving a support hook 472 to suspend the digital pricing display 420 therefrom. The digital display screen 430 can display information such as, but not limited to, product and item number 432, price of the product 434, and a barcode 436 for the product, and is functionally and schematically the same as digital pricing display 120 as shown in FIG. 4.

An elongate strip 460 has an inverted U-shaped hanger 472 defining a downward facing channel 473 at a top end thereof for receiving the top edge of a door (not shown) therein to support the door digital pricing display 400 from the door. The elongate strip 460 has a support hook 472 extending from an upper portion thereof for receiving hole 439 of the digital display 420. A plurality of hooks 462 extend from a face 468 of the elongate strip 460 for receiving a hole defined by an upper portion of a product for sale. A series of tabs 464 can also be formed on and extend from the face 368 of the elongate strip 460 to further secure a product to the elongate strip 460. Additionally, a suction cup 466 is positioned opposite of hooks 462 and attached to a bottom 467 of the elongate strip 460 for stabilizing the over the door digital pricing display 400 to a substantially smooth vertical surface of the door.

Figure 8:
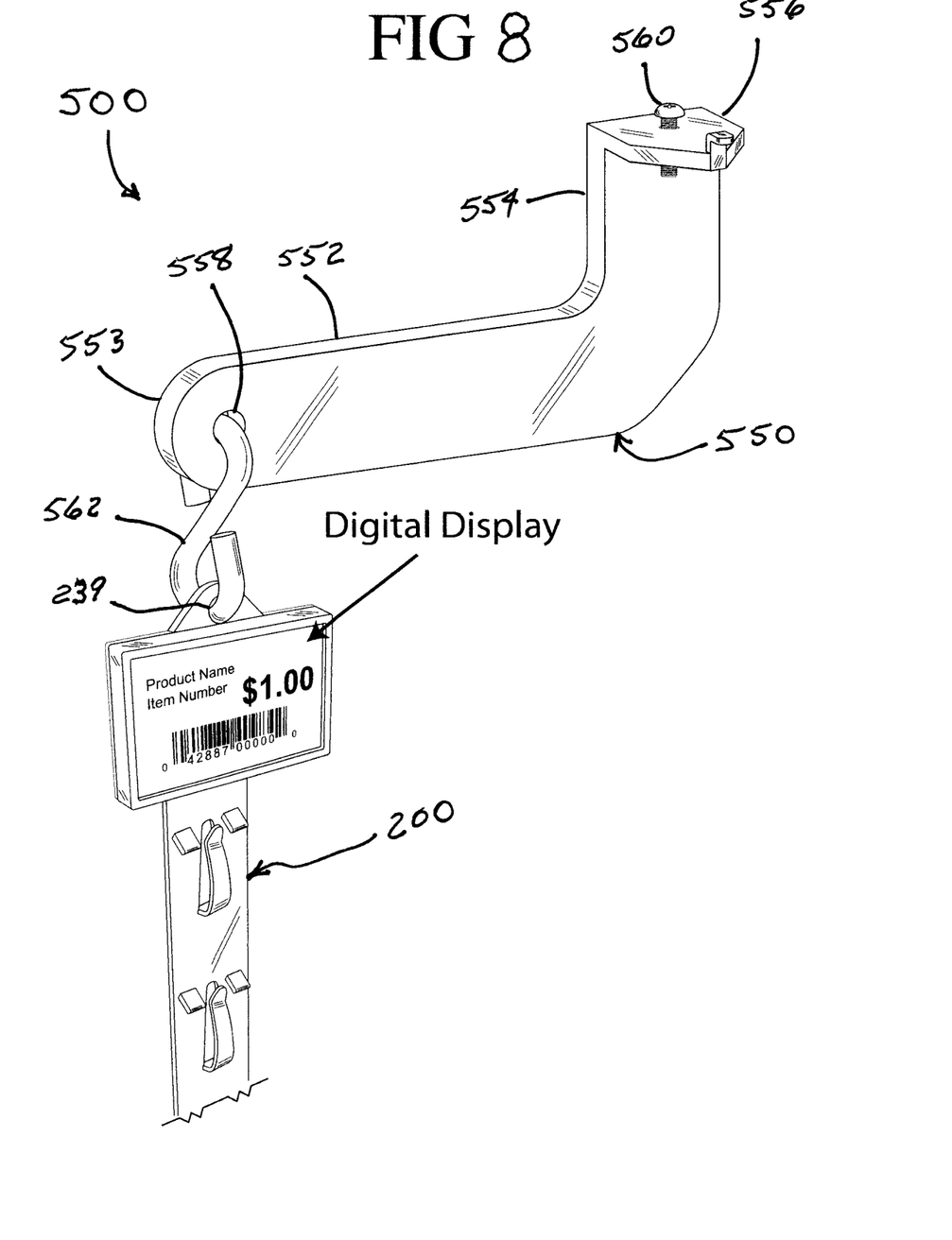
FIG. 8 presents a fourth configuration of a clip strip digital price display and bracket for attaching to a shelf.

A further embodiment of the present invention is illustrated in FIG. 8 wherein a shelf clip strip digital pricing display 500 is shown. A clip strip digital pricing display 200 as described above in FIG. 5 is combined with a shelf support 550. The shelf support 550 includes a vertical leg 554 and a horizontal leg 552 extending forwardly from the vertical leg 554. The horizontal leg 552 defines a hole 558 at a distal end 553. An S-hook 562 is engaged in hole 558 of the horizontal leg 552 and also in hole 239 to suspend the clip strip digital pricing display 200 therefrom. The shelf support 550 further includes at an upper end of vertical leg 554 an integral bracket 556 formed to interface with a product display shelf (not shown) and which can be secured to the product display shelf with a threaded fastener 560.

The above description is considered that of certain embodiments of the present invention only. Modifications of the invention will occur to those skilled in the art and to those who make or use the invention. Therefore, it will be understood that the embodiments described herein are merely for illustrative purposes only and are not intended to limit the scope of the invention hereof.

The invention claimed is:
1. A digital pricing display comprising:
   a digital display unit having in interoperable communication:
      a central processing unit;
      a display screen;
      a memory;
      a communication module having an antenna associated therewith; and
      an instruction set hosted on the memory and executable by the central processing unit, the instruction set operational to receive information for a product and to display the information on the display screen; and an elongate strip attached to the digital display unit, the elongate strip having a plurality of hooks formed thereon, each hook for receiving thereon a product corresponding to the information displayed by the digital display unit.

2. The digital pricing display according to claim 1 wherein the digital display unit receives the information from a remote terminal.

3. The digital pricing display according to claim 2 wherein the received information includes at least a product identification, a product price, and a digital code corresponding to the product.

4. The digital pricing display according to claim 3 wherein the digital code is a bar code.

5. The digital pricing display according to claim 1 further including a suction cup at a distal end of the elongate strip for securing to a portion of a display stand.

6. The digital pricing display according to claim 1 wherein substantially adjacent to each hook at least one tab extends from the elongate strip for stabilizing a product hanging from the hook.

\* \* \* \* \*